(No Model.)

G. W. GALE.
WELL EXCAVATOR.

No. 479,149. Patented July 19, 1892.

Witnesses
C. J. Williamson.
A. L. Hough

Inventor
George W. Gale
by Franklin H. Hough
his Attorney

UNITED STATES PATENT OFFICE.

GEORGE W. GALE, OF GREELEY, COLORADO.

WELL-EXCAVATOR.

SPECIFICATION forming part of Letters Patent No. 479,149, dated July 19, 1892.

Application filed January 5, 1892. Serial No. 417,087. (No model.)

*To all whom it may concern:*

Be it known that I, GEORGE W. GALE, a citizen of the United States, residing at Greeley, in the county of Weld and State of Colorado, have invented certain new and useful Improvements in Well-Excavators; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has for its object to provide an excavating apparatus adapted more particularly for use in well-making.

To this end it consists principally in a pair of buckets or scoops hinged to each other so as to be capable of being opened and closed, which are connected together in such a manner that the lifting or elevating means employed will operate to draw them together upon a quantity of earth, &c., before moving the same upward.

It consists, further, in other features and details of construction which will hereinafter be set forth.

Figure 1:
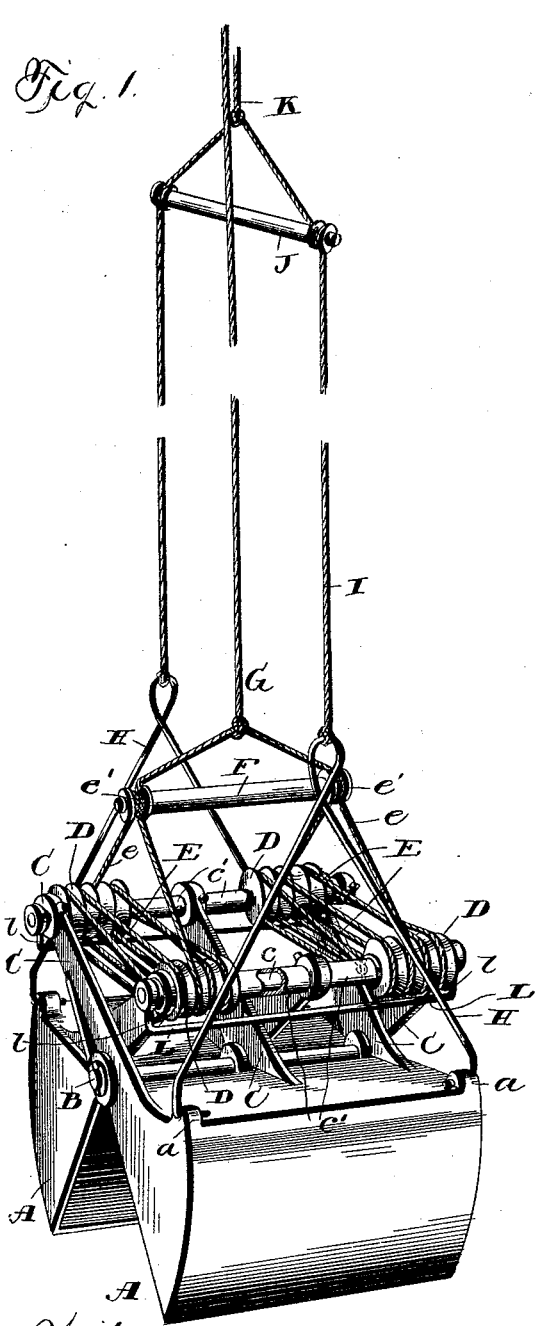
Figure 2:
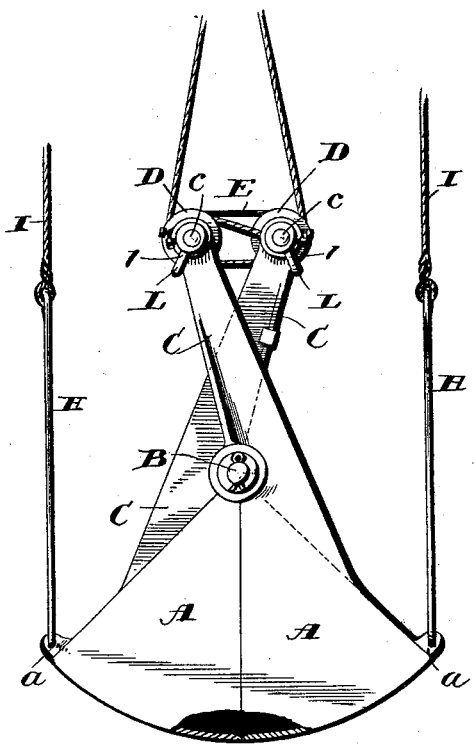

In the accompanying drawings, Figure 1 is a perspective view of my apparatus with the buckets in an open position; Fig. 2, a side elevation when closed.

Referring to the drawings in detail, A and A designate two segmental-shaped buckets or scoops pivoted both on a shaft B in such manner that they may be moved toward each other into a closed position. Each bucket is provided with three straight radial arms C of equal length, located at each side and at the center thereof, and the arms of one bucket are placed close to the arms of the other. Connecting the outer ends of the arms of each bucket is a rod or shaft c, on which, between the central and each side arm C, but nearest the latter, are a number of wheels or pulleys D, preferably, but not necessarily, four. Two sets of pulleys are thus provided, one at each side of the buckets, and over each set is reaved a rope E, whose ends are fastened one to one rod or shaft c and the other to the other rod c. The rope has such length that when the buckets are spread apart to a fully-open position, as shown in Fig. 1, there will be enough slack to allow the loops e and e to be lifted from the middle portion, which by eyes e' and e' are secured to a rod or bar F. To the latter is attached the lifting-rope G, which is carried over a pulley in a crane or other suitable support and preferably provided with means for the attachment of horses, although of course any other power may be used instead of the latter, if desired. By connecting the arms of the two buckets by a tackle or a system of pulleys and ropes an upward pull on the rope G will not raise or tend to raise said buckets when they are open, but will first move them in toward each other and cause them to scoop or take in the material to be elevated, because the power to close said buckets is applied directly to them in a horizontal plane and the lifting thereof cannot take place until their inward movement ceases, as when they come together. Were the system of pulleys and ropes dispensed with and the lifting-rope applied directly to the shafts or rods c there would be an upward tendency of the buckets almost simultaneously with the closing thereof. To keep the two sets of pulleys on each shaft or rod c in place against lateral movement, a sleeve or tubular piece c' is put on said shaft, with its opposite end abutting against the inner pulleys of each set.

On the upper side of each bucket, near its curved face, are two perforated lugs or eyes a and a, with which the inwardly-turned ends of a Λ-shaped loop H engage. To an eye formed at the junction of the legs of the latter is connected one end of the rope or chain I, whose other and upper end is connected to a horizontal bar J, to which is connected a single rope K. When the buckets in a closed position are raised and moved to the place to discharge their contents, if the rope K be fastened and the lifting-rope G slacked, as by backing the horses, if such be used, the gravity of the buckets and their contents will automatically open the former to discharge the latter, as the points of connection of the ropes or chains I and I to the buckets are on sides of the axis thereof opposite the connection of the rope G to the arms C. The ropes I and I and K are used to lower the buckets into the well, during which act the rope G is slackened, so that all weight of the bucket is upon the former, because, as above indicated, the buckets are thus returned to work in an open condition. As indicated hereinbefore, I may use a greater or less number of pulleys than four in each set, it being necessary to have only such a number as will enable the rope rove around them in horizontal lines to apply in a horizontal plane sufficient power to the buckets to close them, and I also wish it understood that I do not limit myself to the use of my apparatus in the digging of wells, as the same is adapted for use in elevating various materials.

As a guard to keep the ropes on the pulleys I employ a rod or bar L, placed close to the latter and parallel with each shaft or rod c and supported in place by short arms or extensions l at each end, which have eyes that engage with end portions of said shaft or rod that project slightly beyond the outer arms C C of the bucket.

What I claim is—

1. In combination, the two buckets, the shaft hinging them, the sets of radial arms on each bucket, the rods connecting such arms, the two sets of pulleys on each rod, the sets on one rod being arranged opposite the sets on the other, ropes or chains connecting each set on one rope to the opposite set on the other, the bar connecting the two latter ropes, and the lifting means connected to said bar, substantially as described.

2. In combination, the two buckets, the shaft hinging them, the sets of radial arms on each bucket, the rods or shafts connecting such arms, the pulleys or wheels on the rods or shafts, the ropes or chains connecting in horizontal lines the pulleys of one rod with those of the other, the lifting rope or chain connected to said ropes or chains, and the lowering rope or chain connected to each bucket on the side of its hinge opposite the arms thereof, and the rod connecting said ropes, substantially as shown and described.

In testimony whereof I affix my signature in presence of two witnesses.

GEORGE W. GALE.

Witnesses:
   J. B. PHILLIPS,
   W. A. HOTCHKISS.